United States Patent
McLoughlin et al.

(10) Patent No.: US 10,669,413 B2
(45) Date of Patent: *Jun. 2, 2020

(54) COMPOSITION COMPRISING SEMI-CRYSTALLINE POLYOLEFIN AND SULFONYL-AZIDE, RESULTING FOAMS AND METHODS OF MAKING THE SAME

(71) Applicant: Braskem America, Inc., Philadelphia, PA (US)

(72) Inventors: Kimberly Miller McLoughlin, Pittsburgh, PA (US); William Scott Miller, Pittsburgh, PA (US); Michael Robert Stephans, Pittsburgh, PA (US); Steven Michael Krupinski, Pittsburgh, PA (US)

(73) Assignee: Braskem America, Inc., Philadelphia, PA (US)

(*) Notice: Subject to any disclaimer, the term of this patent is extended or adjusted under 35 U.S.C. 154(b) by 128 days.

This patent is subject to a terminal disclaimer.

(21) Appl. No.: 15/010,099

(22) Filed: Jan. 29, 2016

(65) Prior Publication Data

US 2016/0222180 A1 Aug. 4, 2016

Related U.S. Application Data

(60) Provisional application No. 62/110,120, filed on Jan. 30, 2015.

(51) Int. Cl.
| | |
|---|---|
| *C08L 23/12* | (2006.01) |
| *C08K 5/43* | (2006.01) |
| *C08J 9/00* | (2006.01) |
| *C08J 5/18* | (2006.01) |

(52) U.S. Cl.
CPC .......... *C08L 23/12* (2013.01); *C08J 5/18* (2013.01); *C08J 9/0033* (2013.01); *C08J 9/0061* (2013.01); *C08K 5/43* (2013.01); *C08J 2201/03* (2013.01); *C08J 2205/00* (2013.01); *C08J 2323/12* (2013.01); *C08J 2323/32* (2013.01); *C08J 2423/12* (2013.01); *C08L 2205/025* (2013.01); *C08L 2205/03* (2013.01); *C08L 2205/035* (2013.01); *C08L 2205/06* (2013.01)

(58) Field of Classification Search
CPC ... C08L 23/12; C08L 2205/025; C08J 9/0033; C08J 9/105; C08K 5/43
See application file for complete search history.

(56) References Cited

U.S. PATENT DOCUMENTS

| | | | | |
|---|---|---|---|---|
| 5,986,009 A | * | 11/1999 | Thoen | ..................... C08L 23/10 525/232 |
| 6,204,348 B1 | | 3/2001 | Raetzsch et al. | |
| 6,433,109 B1 | | 8/2002 | Raetzsch et al. | |
| 6,472,473 B1 | | 10/2002 | Ansems et al. | |
| 6,649,666 B1 | | 11/2003 | Read et al. | |
| 6,800,669 B2 | * | 10/2004 | Thoen | ..................... C08J 9/141 521/143 |
| 8,404,324 B2 | | 3/2013 | Lutz et al. | |

FOREIGN PATENT DOCUMENTS

| | | |
|---|---|---|
| WO | 01/40374 A2 | 6/2001 |
| WO | 02/34824 A2 | 5/2002 |

OTHER PUBLICATIONS

Search Report and Written Opinion issued in connection with corresponding International patent application No. PCT/US2016/015580, dated Apr. 7, 2016, 10 pages.

* cited by examiner

*Primary Examiner* — Kara B Boyle
(74) *Attorney, Agent, or Firm* — Duane Morris LLP

(57) ABSTRACT

A foamable composition includes a semi-crystalline polyolefin having a crystallinity of at least 50% and a poly (sulfonyl azide) of at least 500 ppm based on the total weight of the foamable composition. The foamable composition has a melt strength of at least 20 cN, a melt drawability of at least 100 mm/s, flexural modulus is greater than about 240,000 psi. Such a composition can be used to make a low density foam having a density in the range from 0.005 g/cm³ to 0.6 g/cm³. A resulting foam or a fabricated article, the methods of the composition and the foam are also provided.

22 Claims, No Drawings

COMPOSITION COMPRISING SEMI-CRYSTALLINE POLYOLEFIN AND SULFONYL-AZIDE, RESULTING FOAMS AND METHODS OF MAKING THE SAME

RELATED APPLICATIONS

This application claims the benefit of U.S. Provisional Application No. 62/110,120, filed Jan. 30, 2015, which application is expressly incorporated by reference herein in its entirety.

FIELD OF THE INVENTION

The disclosure relates to polymers generally. More particularly, the disclosed subject matter relates to a foamable composition comprising polyolefin such as polypropylene, the method of making and the method of using such a composition and the resulting foam, and a sheet or a fabricated article comprising the resulting foam.

BACKGROUND OF THE INVENTION

Semi-crystalline polyolefins such as polypropylene have gained wide commercial acceptance and usage in numerous applications because of the relatively low cost of the polymers and the desirable properties they exhibit. These properties include good impact resistance, good heat stability and high chemical resistance. In general, polypropylene polymers, particularly propylene homopolymers, have a disadvantage of being brittle with low impact resistance, especially at low temperatures. To address these issues, manufacturers have incorporated another material rubber, which forms a dispersed phase within the polypropylene matrix. These two-phase materials are referred to as impact copolymers or ICPs.

Polyolefins can be also used in the form of foams. Expanded polypropylene (EPP) is a foam form of polypropylene. Foamed polypropylene has very good impact characteristics due to its relatively low stiffness. However, the production of polypropylene foams are limited because of its low melt strength and melt elasticity, and the associated high cost for manufacturing.

SUMMARY OF THE INVENTION

The present invention provides a foamable composition comprising semi-crystalline polyolefin such as polypropylene (PP) and poly(sulfonyl-azide), the resulting foam or a fabricated article, the methods of making such a composition and the resulting foam, and the methods of using the same.

The present invention relates to a polyolefin polypropylene composition with improved melt rheology and melt strength. The composition is suitable for processes with demanding elongational viscosity requirements, including those to produce low-density polypropylene foam. The composition is produced by coupling or reacting semi-crystalline polyolefin such as polypropylene homopolymer with poly (sulfonyl azide) to form a foamable polymer in a single extrusion step.

In some embodiments, the foamable composition comprises a semi-crystalline polyolefin having a crystallinity of at least 50%, and a poly(sulfonyl azide) of at least 500 ppm, based on the total weight of the foamable composition. The foamable composition has a melt strength of at least 20 cN, and a melt drawability of at least 100 mm/s. The composition is capable of being used to make a foam having a suitable density. For example, the density can be in the range from 0.005 $g/cm^3$ to 0.6 $g/cm^3$ (e.g., from 0.01 $g/cm^3$ to 0.14 $g/cm^3$ or from 0.01 $g/cm^3$ to 0.1 $g/cm^3$). The resulting foam may have a closed-cell or a partial open-cell structure.

The semi-crystalline polyolefin can be a homopolymer such as a polypropylene homopolymer, which can have a high melting flow index, for example, of at least 1.8 g/10 minutes (e.g., in the range from 15 g/10 minutes to 40 g/10 minutes or from 15 g/10 minutes to 25 g/10 minutes). The crystallinity of the semi-crystalline polyolefin can be in the range of from 60% to 90% (such as from 70% to 80%). The content of the poly(sulfonyl azide) is in the range from 500 ppm to 3,000 ppm (such as from 1,000 ppm to 2,000 ppm), based on the total weight of the foamable composition, in some embodiments.

The foamable composition has a melt strength in the range of from 30 cN to 100 cN (e.g., from 30 cN to 80 cN) in some embodiments. The foamable composition can also have a melt drawability in the range of from 120 mm/s to 200 mm/s (e.g., from 140 mm/s to 170 mm/s). The foamable composition can have a suitable melting temperature (Tm) and a suitable crystallization temperature (Tc). For example, such a melting temperature (Tm) can be of at least 140° C., for example, in the range of from 160° C. to 170° C. Such a Tc temperature can be of at least 120° C. (e.g., at least 130° C.).

The present disclosure also provides foam resulting from the foamable composition. The resulting foam comprises a semi-crystalline polyolefin having a crystallinity of at least 50% and coupled with a poly(sulfonyl azide) of at least 500 ppm, based on the total weight of the foamable composition. The semi-crystalline polyolefin coupled with a poly(sulfonyl azide) has a melt strength of at least 20 cN, and a melt drawability of at least 100 mm/s. The foam is a low density foam having a density in the range from 0.005 $g/cm^3$ to 0.6 $g/cm^3$ (e.g., from 0.01 $g/cm^3$ to 0.14 $g/cm^3$ or from 0.01 $g/cm^3$ to 0.1 $g/cm^3$). The composition of the foamable composition or the semi-crystalline polyolefin coupled with a poly(sulfonyl azide) is described above. For example, in such as foam, the semi-crystalline polyolefin is a homopolymer such as a polypropylene homopolymer having a suitable melting flow index. The semi-crystalline polyolefin has a crystallinity in the range of from 70% to 80% in some embodiments. The content of the poly(sulfonyl azide) can be in the range from 500 ppm to 3,000 ppm (e.g., from 1,000 ppm to 2,000 ppm), based on the total weight of the foamable composition, in some embodiments. The semi-crystalline polyolefin coupled with a poly(sulfonyl azide) has a melt strength in the range of from 30 cN to 100 cN (e.g., from 30 cN to 80 cN), and a melting temperature of at least 140° C. (e.g., in the range of from 160° C. to 170° C.) in some embodiments.

The present disclosure also provides the method of making the composition and the foam described above. In some embodiments, the method of preparing a foam comprises mixing a copolymer comprising a first ethylene comonomer and a second C3-C12 alpha-olefin comonomer, or a semi-crystalline polyolefin having a crystallinity of at least 50%. Either with the copolymer or semi-crystalline polyolefin is mixed poly(sulfonyl azide) of at least 500 ppm, through a single extrusion step. Such a mixing step provides a foamable composition having a melt strength of at least 20 cN, and a melt drawability of at least 100 mm/s. Such a method may further comprise steps of cooling and solidifying the foamable composition, and pelletizing the foamable composition. Optionally the pelletized composition can be stored and transported to a different location. A foam can be then made using the foamable composition and a blowing agent through a second single extrusion process. The pelletized foamable composition can be melted at an increased temperature before the blowing agent is added. The resulting foam is a low density foam having a density in the range from 0.005 g/cm³ to 0.6 g/cm³ (e.g., from 0.01 g/cm³ to 0.14 g/cm³ or from 0.01 g/cm³ to 0.1 g/cm³). The resulting foam may have closed-cell or open-cell structure.

The method of making the foam can further comprise blending a second semi-crystalline polyolefin without containing poly(sulfonyl azide) with the foamable composition before the step of forming the foam. The second semi-crystalline polyolefin can be of the same type as semi-crystalline polyolefin having a crystallinity of at least 50%. In some embodiments, the method further comprises blending a copolymer before the step of forming the foam. The copolymer can comprise a first ethylene comonomer and a second C3-C12 alpha-olefin comonomer. For example, the copolymer can be impact copolymer propylene (ICP) composition comprising a polypropylene-based matrix of from 75% to 90% by weight of ICP the composition, and an ethylene propylene copolymer rubber (EPR) phase of from 8% to 25% by weight of the ICP composition, wherein the EPR phase comprises from 35% to 45% by weight of ethylene.

The present disclosure also provides a method of using the composition provided in this invention. In another respect, the present disclosure provides a fabricated article and a method for making the fabricated article, which comprises the composition described above. The composition has a foamed structure.

The composition and the fabricated article provided in this invention exhibit unexpected properties including but not limited to high uniformity of low-density closed cells, high rigidity, and high temperature resistance. The foamable composition can be solidified, optionally pelletized and stored, transported, and then re-heated with a blowing agent and foamed at any time after such a composition is produced. The method of making the foam described above also has advantages including but not limited to low manufacturing cost and high efficiency.

DETAILED DESCRIPTION OF THE INVENTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

The present invention provides a foamable composition comprising semi-crystalline polyolefin such as polypropylene (PP) and poly(sulfonyl-azide), the resulting foam, the methods of making and the method of using such a composition and such a foam, and a sheet or a fabricated article comprising the resulting foam.

Semi-crystalline polypropylene suitable for foaming has been disclosed. Such compositions are long-chain branched materials, formed from polypropylene as a starting material. However, the production methods to provide branched PP are prohibitively expensive, capital-intensive, and capacity-limited. There exists a need to provide a polypropylene suitable for foaming based on an efficient, single-step reactive extrusion process.

U.S. Pat. Nos. 6,204,348, 6,433,109 and European Patent No. 08798301 assigned to Borealis Gmbh disclose a modified polypropylene of improved processability, which are produced by the reaction of polypropylene with unsaturated monomers. A modified propylene homopolymer is produced by a continuous method from a propylene homopolymer having a melt index of 0.05 to 35 g/10 min at 230° C./2.16 kg and an ethylenically unsaturated, multifunctional monomer such as butadiene. PP powder is first contacted at elevated temperature in a continuous mixer with a mixture of butadiene gas and oxygen. The mixture is then fed to an extruder and mixed at a series of elevated temperatures. Finally, the molten mixture is de-volatilized in a sequence of de-gas steps. However, this multi-step process requires the installation of specialized reactor (continuous mixer) to contact the PP powder with butadiene gas mixture at elevated temperature prior to extrusion in a specialized, reactive extruder with multiple de-volatilization zones.

Ionizing radiation such as electron beam is also used to produce modified PP with rheology suitable for foaming. However, these processes require capital-intensive electron beam equipment in series with vessels to contact the irradiated polymer with inert gas containing a controlled amount of oxygen at elevated temperature. Therefore, such processes are expensive and are limited in the volume of modified polymer that can be produced.

U.S. Pat. No. 6,472,473 discloses compositions comprising coupled impact propylene polymer formed by the reaction of a poly(sulfonyl azide) as a coupling agent with propylene impact copolymer having an elastomeric phase. The elastomeric phase in the propylene impact copolymer comprises a copolymer or a terpolymer containing another monomer such as ethylene. As shown in the Examples, a very low concentration (<1,000 ppm) of poly(sulfonyl azide) is coupled with impact propylene polymers having very low melt flow rate (MFR, <2). When coupled to increase melt strength, a starting material having a low MFR is known to provide even lower MFR, which correlates with extremely high melt viscosity. The extremely high melt viscosity prohibits the use of this technology on a foam extrusion line.

U.S. Pat. No. 8,404,324 discloses a mineral-filled, polypropylene composition comprising (i) a coupled blend of a polypropylene homopolymer and an impact modifier, (ii) greater than 53 weight percent (wt. %) based on the weight of the composition of at least one mineral filler, and (iii) a foaming agent. The resulting foamed polypropylene can be used as one of the layers in a pipe application.

U.S. Pat. No. 6,649,666 discloses a process for preparing a foam comprising the steps of: (i) introducing into a melt processing device: (a) a propylene polymer and (b) a coupling amount of a poly(sulfonyl azide), forming a propylene polymer admixture, (ii) exposing the propylene polymer admixture to a temperature sufficient to result in coupling of the propylene polymer forming a molten coupled propylene polymer composition, (iii) introducing a blowing agent before, during or after the coupling of the propylene polymer under a first pressure which maintains the blowing agent in the molten coupled propylene polymer composition, (iv) cooling the molten coupled propylene polymer composition comprising the blowing agent, (v) processing the molten coupled propylene polymer composition comprising the blowing agent into a zone having a second pressure which allows for the blowing agent to escape from the molten coupled propylene polymer composition, and (vi) forming a resulting foam. Foamed PP has been made in a single process in which unmodified PP with poly(sulfonyl azide) are combined, and then a foaming agent is added to the molten mixture to produce foam directly in a single step. As shown in the Examples, polypropylene, poly(sulfonyl azide) and the foaming agent are added together on one single extruder before the mixture is cooled down.

U.S. Pat. No. 6,800,669 claims a foam comprising a propylene copolymer material comprising at least 50 wt. % of units derived from propylene and units derived from ethylenically unsaturated comonomers and having a melt flow rate in the range of from 0.5 to 8 g/10 min, a melt strength of at least 5 cN, and a melt drawability of at least 20 mm/s, and the foam has a density of 50 Kg/m³ or less, exhibits an Asker-C hardness of 35 or less, and exhibits a Compressive Strength of 103 kPa or less as determined in accordance with ASTM 3575 for twenty five percent compression.

However, there is a need for a semi-crystalline polyolefin such as polypropylene homopolymer suitable for foaming that can be produced using a less expensive, more efficient process, such as a single reactive extrusion step. Even for azide-coupled polypropylene compositions, there is a need for a single-component, or a single-phase (i.e. without an elastomeric phase), semi-crystalline composition suitable to produce a low-density foam. The resulting foamable composition needs to provide a single-layer (or uniformly foamed) structure having high rigidity at high temperatures. In addition, there exists a need for a coupled polyolefin which can be solidified, optionally pelletized and stored, transported, and then re-heated with a blowing agent and foamed at any time after the polymer is produced. The foamable composition and the resulting foam and the methods of making the same meet these needs.

The term "polymer," as used herein, refers to a polymeric compound prepared by polymerizing monomers, whether of the same or a different type. The generic term polymer thus embraces the term "homopolymer," usually employed to refer to polymers prepared from only one type of monomer, as well as "copolymer" which refers to polymers prepared from two or more different monomers.

"Polypropylene" shall mean polymers consisting of propylene monomer, such as polypropylene homopolymer. "Polypropylene-based resin" or "polypropylene-based polymer" and "polypropylene" are used synonymously. These terms shall mean polymers containing at least 50% by weight, based on the weight of the polymer, of propylene units.

For brevity, unless expressly indicated otherwise, references to "sulfonyl azide," or "poly(sulfonyl azide)" made in the present disclosure will be understood to encompass a compound having multiple function group of sulfonyl azide groups ($-SO_2N_3$). The poly(sulfonyl azide) is any compound having at least two sulfonyl azide groups ($-SO_2N_3$) reactive with the propylene polymer. Preferably the poly (sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the propylene polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 20, most preferably less than about 15 carbon, oxygen or silicon atoms. Silicon containing groups include silanes and siloxanes, preferably siloxanes.

A "coupled polymer" is a rheology modified polymer resulting from a coupling reaction. Coupled polymers are also referred to herein as "modified polymers" or "rheology modified polymers."

In some embodiments, the foamable composition comprises a semi-crystalline polyolefin having a crystallinity of at least 50%, and a poly(sulfonyl azide) of at least 500 ppm, based on the total weight of the foamable composition. The foamable composition has a melt strength of at least 20 cN, a melt drawability of at least 100 mm/s, a flexural modulus is greater than about 240,000 psi, and a suitable melting temperature, for example, of at least 140° C. The composition is capable of being used to make a low density foam having any suitable density, which may be in the range from 0.005 g/cm³ to 0.6 g/cm³ (e.g., from 0.01 g/cm³ to 0.14 g/cm³ or from 0.01 g/cm³ to 0.1 g/cm³).

The semi-crystalline polyolefin can be a homopolymer. Examples of a suitable semi-crystalline polyolefin include but are not limited to a polypropylene, or a polyethylene, or any combination thereof. Examples of the polypropylene include but are not limited to a polypropylene homopolymer. For example, a polypropylene (PP) homopolymer (HP) having melt index of at least 1.8 g/10 minutes (e.g., in the range from 15 g/10 minutes to 40 g/10 minutes or from 15 g/10 minutes to 25 g/10 minutes) are used in the present disclosure. The crystallinity of the semi-crystalline polyolefin can be in the range of from 60% to 90% (such as from 70% to 80%). The polypropylene homopolymer can be made through Ziegler-Natta catalysis.

Examples of a suitable poly(sulfonyl)azides include but are not limited to 1,5-pentane bis(sulfonylazide), 1,8-octane bis(sulfonyl azide), 1,10-decane bis(sulfonyl azide), 1,10-octadecane bis(sulfonyl azide), 1-octyl-2,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, a mixture or any combination thereof.

In some embodiments, the content of the poly(sulfonyl azide) is in the range from 500 ppm to 3,000 ppm (such as from 1,000 ppm to 2,000 ppm), based on the total weight of the foamable composition. The poly(sulfonyl azide) can be added in the form of a molecular melt with other ingredients such as an antioxidant.

The propylene polymer and the coupling agent poly (sulfonyl azide) are physically mixed. Such physical mixing can occur in any equipment, such as V-blenders, ribbon or paddle blenders, tumbling drums, or extruders, which mix the coupling agent and the propylene polymer. The term extruder is used for its broadest meaning to include such devices as a device that extrudes pellets as well as an extruder which produces the extrudate for forming into various articles. The physical mixing can occur in the early stages of an extruder, such as a twin screw extruder. In some embodiments, the semi-crystalline polyolefin and the poly (sulfonyl azide) can be mixed at a regular compounding set-up such as on a twin-screw extruder, through a single extrusion process or a single reactive extrusion process. In particular, the propylene polymer and the coupling agent poly(sulfonyl azide) may be physically mixed by simultaneously introducing the propylene polymer resin and the coupling agent into the feed section of an extruder, such as through a main feed hopper or through multiple feeders. Optionally, the polysulfonyl azide may be pre-blended with a polyolefin to form a masterbatch, and the polysulfonyl azide may be introduced to the extruder by feeding the masterbatch to the feed section extruder along with the propylene polymer. Alternatively, the polysulfonyl azide may be added to the extruder downstream of feed zone, such as through a side-feeder. During extrusion, the mixture of semi-crystalline polyolefin and the poly(sulfonyl azide) is heated to a temperature sufficient to cause the polysulfonyl azide and the polyolefin to chemically react. The temperature can be any suitable temperature, for example, in the range of from 190° C. to 280° C. The residence time at the reaction temperature can be in any suitable range such as in the range from 15 seconds to 60 seconds. The foamable composition is cooled and pelletized. The resulting foamable composition can be reheated and melted for processing to form useful articles. The pelletized composition can be stored and transported to a production site for making foam. In the forms of pellets, granules or any other suitable solid forms, the foamable composition can be transported to a different location before the foam preparation.

In the process of making a foamable composition, the polysulfonyl azide can be added into a side-feeder, or a main hopper together with a polymer or a masterbatch.

In one embodiment, a polysulfonyl azide is melt-mixed with a propylene polymer in an extruder equipped with a side-feeder, which feeds the polysulfonyl azide directly into the heated extruder barrel. The propylene polymer is added to the extruder through a main hopper and melted by the extrusion process. The polysulfonyl azide is added to the extruder downstream. Optionally, the polysulfonyl azide is in the form of a molecular melt. The polysulfonyl azide or molecular melt may be dry-blended with a propylene polymer prior to side-feeding.

In another embodiment, a polysulfonyl azide is fed into an extruder through a main hopper, together with a propylene polymer. The polysulfonyl azide is added to the extruder along with a propylene polymer and optionally other additives, including but not limited to antioxidants and acid scavengers, through the main hopper. Optionally, a second propylene polymer may be added to the extruder. The second polymer may be a copolymer of propylene and an alpha-olefin, such as ethylene or octene. The azide may be dry-blended with the propylene polymer and loaded into a single feeder prior to adding to an extruder. Alternatively, the azide and the propylene polymer may be added from separate feeders.

In a preferred embodiment, the polysulfonyl azide is in the form of a molecular melt. The molecular melt is added to an extruder along with 80-95 weight % of a first propylene polymer and 5-20 weight % of a second propylene polymer, which is a copolymer of propylene and alpha-olefin. The second propylene polymer has a melting point lower than that of the first propylene polymer. Examples of suitable second propylene polymers include metallocene-catalyzed ethylene-propylene polymers and ethylene-octene polymers.

In another embodiment, the sulfonyl azide or molecular melt is fed to the main hopper along with an lower-melting point oil, wax, or polymer with melting point less than that of the propylene polymer.

In another embodiment, a polysulfonyl azide is added to an extruder through a main hopper in the form of or together with a master batch. The polysulfonyl azide or molecular melt is melt-mixed with a propylene polymer in a first extrusion step at a temperature below the reaction temperature of the polysulfonyl azide. When DPOBSA is used, the temperature is no higher than 180° C. In a second step, the resulting mixture of PP with sulfonyl azide (called a masterbatch) is fed to an extruder, together with a propylene polymer, through a main hopper and melted by the extrusion process. Optionally, the polysulfonyl azide masterbatch may be added to the extruder downstream by side-feeding.

The foamable composition has a melt strength in the range of from 30 cN to 100 cN (e.g., from 30 cN to 80 cN) in some embodiments. The foamable composition can also have a melt drawability of at least 120 mm/s (e.g., at least 140 mm/s, 170 mm/s, or even 200 mm/s). The foamable composition can have a melting temperature (Tm) in the range of from 160° C. to 170° C., and a crystallization temperature (Tc temperature) of at least 120° C. or at least 130° C. A foam can be made using such a foamable composition, i.e. the semi-crystalline polyolefin coupled with a poly(sulfonyl azide). As described above, the resulting foam comprises a semi-crystalline polyolefin having a crystallinity of at least 50% and coupled with a poly(sulfonyl azide) of at least 500 ppm, based on the total weight of the foamable composition. For example, the semi-crystalline polyolefin coupled with a poly(sulfonyl azide) has a melt strength of at least 20 cN, a melt drawability of at least 100 mm/s, and a melting temperature of at least 160° C. The foam can be a low density foam having a density in the range from 0.005 g/cm$^3$ to 0.6 g/cm$^3$ (e.g., from 0.01 g/cm$^3$ to 0.1 g/cm$^3$). The resulting foam can have a closed-cell or an open-cell structure.

In some embodiments, the semi-crystalline polyolefin used is a homopolymer such as a polypropylene homopolymer having a high melting flow index. The semi-crystalline polyolefin has a crystallinity in the range of from 70% to 80% in some embodiments. The content of the poly (sulfonyl azide) can be in the range from 500 ppm to 3,000 ppm (such as from 1,000 ppm to 2,000 ppm), based on the total weight of the foamable composition, in some embodiments.

In some embodiments, the semi-crystalline polyolefin coupled with a poly(sulfonyl azide) has a melt strength in the range of from 30 cN to 100 cN (e.g., from 30 cN to 80 cN), and a melting temperature in the range of from 160° C. to 170° C.

A foam can be made using the foamable composition and a blowing agent through a second single extrusion process. The pelletized foamable composition can be melted at an increased temperature before the blowing agent is added. Such a single extrusion or a reactive extrusion step can be performed in an extruder such as one or more single-screw extruders, or a twin-screw extruder. In one embodiment, the inventive composition could be combined with liquefied butane in a first extruder. Optionally, foam cell nucleating agent could be added, such as talc. Optionally, a chemical blowing agent formulation could be added such as those sold under trade names SAFOAM, HYDROCEROL, or ECO-CELL. The first extruder would melt the foamable composition and mix it with the nucleating agent(s) and foaming agent(s). The resulting melt mixture would then be fed directly to a second extruder fitted with a die, through which the mixture would be extruded. The melt temperature of the composition exiting the die could be in the range from 150 to 175° C. The resulting pressure drop at the die would provide for expansion of the blowing agent(s), and the polymer composition would form a foam. Optionally, the die geometry could provide for a foamed strand or a foamed sheet to be produced. In the case of an annular die, the foam could be drawn over a mandrel, then cooled and slit to form a foamed sheet. In another embodiment, the foamable composition could be blended with liquid $CO_2$ in the first extruder (optionally with cell nucleating agents and/or chemical blowing agents.) Other foaming agent gases could also be used (nitrogen, other hydrocarbons, CFCs, HFCs.) The resulting foam is a low density foam having a density in the range from 0.005 $g/cm^3$ to 0.6 $g/cm^3$ (e.g., from 0.01 $g/cm^3$ to 0.14 $g/cm^3$ or from 0.01 $g/cm^3$ to 0.1 $g/cm^3$). The resulting foam provides high uniformity of low-density, high rigidity, and high temperature resistance.

Before the foaming step, the foamable composition can be blended with a second semi-crystalline polyolefin without containing poly(sulfonyl azide). The second semi-crystalline polyolefin can be of the same type as semi-crystalline polyolefin having a crystallinity of at least 50%. In some embodiments, the second semi-crystalline polyolefin is a PP homopolymer. The method further comprises blending a copolymer before the step of forming the foam. In some embodiments, the method further comprises blending a copolymer before the step of forming the foam. The copolymer can comprise a first ethylene comonomer and a second C3-C12 alpha-olefin comonomer. For example, the copolymer can be impact copolymer propylene (ICP) composition comprising a polypropylene-based matrix of from 75% to 90% by weight of ICP the composition, and an ethylene propylene copolymer rubber (EPR) phase of from 8% to 25% by weight of the ICP composition, wherein the EPR phase comprises from 35% to 45% by weight of ethylene. The ICP may have a xylenes solubles (XS) content of greater than 8 wt % as determined by acetone precipitation, and an intrinsic viscosity (I.V.) of greater than 6.5 dL/g, wherein the ICP composition has a MFR of from 15 to 125 g/10 min.

A sheet or a fabricated article comprising the composition having a resulting foam structure can be made following the foaming step. The composition and the fabricated article provided in this invention exhibit unexpected properties including but not limited to high uniformity of low-density closed cells, high rigidity, and high temperature resistance.

The composition provided in this disclosure can optionally comprise a filler, an additive (e.g., a nucleating agent), or any other suitable ingredient, or combinations thereof.

In some other embodiments of the invention, the foamable composition can be a blended composition with one or more copolymers (e.g., a polypropylene copolymer, polypropylene homopolymer, polyethylene, or mixtures thereof). Blended compositions provided in this disclosure can optionally comprise a filler, an additive (e.g., a nucleating agent) or any other suitable ingredient, or combinations thereof.

A sheet or a fabricated article comprising the blended composition having a resulting foam structure can be made following the foaming step. The blended composition and the fabricated article provided in this invention exhibit unexpected properties including but not limited to high uniformity of low-density closed cells, high rigidity, and high temperature resistance.

EXPERIMENTAL

Twin-Screw Extrusion

All of the mixtures of PP and poly(sulfonyl azide) were processed using twin-screw extrusion according to the conditions provided in Table 1.

Rheotens Melt Strength

Melt strength experiments were conducted using a Göttfert Rheo-Tester 2000 capillary rheometer equipped with a Rheotens 71.97 set-up. A 12 mm capillary barrel was used at a barrel temperature of 190° C. The molten polymer is soaked at the test temperature for 5 minutes prior to the test. A polymer strand was pushed through a 20 mm/2 mm L/D capillary die with a 180° entrance angle at an apparent wall shear rate of ~86 $s^{-1}$. The polymer strand is then fed into the Rheotens unit and is grabbed by two sets of two wheels. The wheel speed is adjusted to reduce the acting force on the polymer strand to approximately zero. Once steady-state is achieved, the speed of the counter-rotating wheels is continuously increased, which deforms the polymer strand until fracture and/or slippage. The polymer strand resistance force to deformation is measured by the Rheotens unit. The peak force recorded during the drawing process is referred to as "melt strength".

The foamable compositions were also tested by an extensional rheology test method consisting of heating the polymer inside of a capillary to form a melt with constant temperature, applying pressure by a piston to force the polymer through a vertical capillary die, and using rotating wheels to draw the extrudate downward with increasing velocity to exert extensional force on the molten extrudate. The force required to draw the extrudate at controlled velocity is measured, and velocity is increased until the molten strand breaks. The peak draw force is reported as the melt strength, and the peak velocity is reported as the melt elongation.

Other Testing Methods

The melting and crystallization temperatures of the modified polypropylenes were measured by differential scanning calorimetry (DSC.) The percent crystallinity of the modified polypropylenes was measured as the ratio of the area under the curve of the heat of melting peak divided by a theoretical maximum Delta-Hm for PP, taken to by 100 J/g.

Differential Scanning calorimetry (DSC) is a technique that measures heat flows associated with transitions in materials as a function of time and temperature in a controlled atmosphere. Non-isothermal DSC sweeps were performed using a TA Instruments 200 instrument. The specimen was equilibrated at 200° C. for 5 minutes. The melt was then cooled to −50° C. at a rate of 10° C./min; the peak temperature of the melt-crystallization exotherm peak was recorded as the crystallization temperature or Tmc. The specimen was then heated back to 200° C. at a rate of 10° C./min and the peak of the melting endotherm was recorded as the melting point or Tm.

As used herein, the "melt flow rate" (MFR) or "melt index" (units of g/10 min or dg/min) is described according to and measured per ASTM D1238 using a load of 2.16 kg at 230° C.

As used herein, the "flexural modulus" is described according to and measured per ASTM D790.

As used herein, the "heat distortion temperature" (HDT) or "heat distortion temperature under load" (DTUL) is described according to and measured per ASTM D-648.

As used herein, the tensile properties is described according to and measured per ASTM D638.

As used herein, "melt strength", "drawability", and "extensibility" may be used interchangeably to describe characteristics and die swell properties of polyolefins (e.g., polypropylene) as measured on a Gottfert Rheotester 2000 unit. The Rheoten 71.87 elongational tester is used to characterize the extensional flow of the polymer melt. The melt strength (MS) is defined as the maximum force at which a molten thread or strand of the polymer as it exists through a heated barrel capillary die and drawn through a pair of Rheoten wheels of a certain diameter and gap distance under selected shear conditions before it breaks. The melting strength method means stretching uniaxially at various speeds and with constant acceleration until breakage of the molten polymer filament as produced. The analysis allows to obtain the resistance to stretching of the polymer melt and its extensibility in a given test condition. Melt strength can also be described as the resistance of a polyolefin melt to stretching. The machine measures the force required to break the polymer melt. And this analysis is known as the melt strength at peak force.

EXAMPLES 1-6

Modified Polypropylene Compositions as Foamable Compositions

Modified polypropylene compositions were produced as foamable compositions by twin screw extrusion of the following ingredients: polypropylene homopolymer having melt flow index 18 dg/min produced on a commercial production by Ziegler-Natta catalysis, a molecular melt containing 4,4'-diphenyl oxide bis(sulfonyl azide) (DPOBSA) phlegmatized in antioxidant, IRGANOX® 1010, an additional stabilizing antioxidant, IRGANOX® B225, or IRGAFOS® 168 and calcium stearate added. IRGANOX® B225 is an antioxidant, commercially available from BASF Corporation. IRGANOX® B225 is a blend of 50% tris(2,4-ditert-butylphenyl)phosphite and 50% pentaerythritol tetrakis[3-[3,5-di-tert-butyl-4-hydroxyphenyl] propionate]. It is basically a blend of 50% IRGAFOSX® 168 (Tris(2,4-di-tert-butylphenyl)phosphite) and 50% IRGANOX® 1010 Tetrakis [methylene (3,5-di-tert-butyl-4-hydroxyhydrocinnamate)]methane. The formulations of Examples 1-6 are shown in Table 1.

In Example 6, a polypropylene homopolymer having melt flow index 35 dg/min produced by Ziegler-Natta catalysis is used, in combination with VISTAMAXX™ 7010FL, which is available from Exxon Mobil Chemical Company. VISTAMAXX™ 7010FL is primarily composed of isotactic propylene repeat units with random ethylene distribution (ethylene content of 17% by weight), and is produced using ExxonMobil's proprietary metallocene catalyst technology. VISTAMAXX™ 7010FL has a melt index of 1.3 g/10 min measure according to and measured per ASTM D1238 using a load of 2.16 kg at 190° C.

In the table, the row labeled "extruder type" specifies the screw size of the twin-screw extruder (TSE). Melt temperature refers the measured temperature recorded by a thermocouple inserted into the extruder barrel near the die. "Residence time" is estimated as the amount of time the polysulfonyl azide and polyolefin were in contact during melt-mixing. The properties of Examples 1-6 are shown in Table 2, as compared to the properties of commercially available Comparative Examples 1-6 as shown in Table 3.

Comparative Example 1 is DAPLOY™ WB140, which is suitable for foaming sold by Borealis having high melt strength, but low stiffness and low temperature resistance. Comparative Example 2 is 6025N, which is a commercial grade of PP homopolymer sold by Braskem that contains an external crystal nucleating agent, and does not have high melt strength. Comparative Examples 3 and 4 are F006EC2 and F008NJ, respectively, which are linear grades of PP homopolymer with high melt strength and very low melt flow rate. Comparative Example 5 is INSPIRE™ 114, a commercial grade of polypropylene impact copolymer sold by Braskem, with high melt strength but low stiffness. Comparative Example 6 is F020HC2, which is a high crystalline PP homopolymer sold commercially by Braskem.

Examples 1-6 demonstrate that the inventive polymer compositions (i.e. the foamable compositions) have higher crystallinity and flexural modulus than a commercially available high-melt-strength polypropylene (HMS-PP), DAPLOY™ WB140 (Comparative Example 1.) Moreover, Examples 1-6 demonstrate that the inventive polymer compositions also demonstrate significantly higher melt extensibility at high melt strength than conventional polypropylenes (Comparative Examples 2-4). High stiffness is demonstrated by delta H, flexural modulus, and heat distortion temperature (distortion temperature under load.)

The unique combination of high stiffness, high melt strength, and high extensibility (melt drawability) provides low density foam with exceptional stiffness as shown below, for example, in Examples 7-9.

TABLE 1

Inventive polymer compositions and extrusion parameters

| | Examples | | | | | |
|---|---|---|---|---|---|---|
| | Ex. 1 | Ex. 2 | Ex. 3 | Ex. 4 | Ex. 5 | Ex. 6 |
| PP (MFI 18) | 99.15 | 99.15 | 99.18 | 99.33 | 99.33 | |
| PP (MFI 35) | | | | | | 94.34 |
| VISTAMAXX ™ 7010FL | | | | | | 5.0 |
| DPOBSA phlegmatized in IRGANOX ® 1010 | 0.65 | 0.65 | 0.65 | 0.55 | 0.55 | 0.55 |

TABLE 1-continued

Inventive polymer compositions and extrusion parameters

|  | Examples | | | | | |
| --- | --- | --- | --- | --- | --- | --- |
|  | Ex. 1 | Ex. 2 | Ex. 3 | Ex. 4 | Ex. 5 | Ex. 6 |
| B225 | 0.15 | 0.15 | 0 | 0 | 0 | 0 |
| IRGAFOS ® 168 | 0 | 0 | 0.12 | 0.07 | 0.07 | 0.07 |
| Calcium stearate | 0.05 | 0.05 | 0.05 | 0.05 | 0.05 | 0.05 |
| Poly(sulfonyl azide), ppm | 1560 | 1560 | 1560 | 1320 | 1320 | 1320 |
| Extruder type | 45 mm TSE | 45 mm TSE | 50 mm TSE | 50 mm TSE | 50 mm TSE | 50 mm TSE |
| Feed location | main hopper | side feeder | side feeder | side feeder | side feeder | side feeder |
| Melt temperature, F. | 405 | 470 | 490 | 490 | 490 | 490 |
| Residence time, sec | 28 | 28 | 19 | 18 | 18 | 18 |

TABLE 2

Properties of inventive polymer compositions

|  | Ex. 1 | Ex. 2 | Ex. 3 | Ex. 4 | Ex. 5 | Ex. 6 |
| --- | --- | --- | --- | --- | --- | --- |
| (BRASKEM ™ Polymer) | Inventive HMS-PP | Inventive HMS-PP | Inventive HMS-PP | Inventive HMS-PP | Inventive HMS-PP | Inventive HMS-PP |
| MFR, dg/min | 1.7 | 1.2 | 0.8 | 1.4 | 2.1 | 3.2 |
| Melt strength, cN | 34 | 40.3 | 52.4 | 55.3 | 43.6 | 45.0 |
| Melt drawability, mm/s | 146 | 153 | 147.7 | 172 | 157.2 | 170.0 |
| Tc (° C.) | 133.8 | 133.8 | 131.2 | 131.4 | 131.4 | 131.3 |
| Tm (° C.) | 163.8 | 162.9 | 163.9 | 163.4 | 163.6 | 164.0 |
| delta Hm (Joules/g) | 107.8 | 112.4 | 105.1 | 111.2 | 110 | 112 |
| Flexural Modulus, sec (psi) | 279,803 | 280,910 | 297,132 | 294,786 |  | 276,090 |
| DTUL@ 66 psi, ° C. | 111 | 114 | 119 | 117 |  | 108.33 |
| Melt strength (cN)/MFR/(dg/min) | 20 | 34 | 66 | 40 | 21 | 14 |
| Melt strength/melt drawability (mm/s) | 0.2 | 0.3 | 0.4 | 0.3 | 0.3 | 0.3 |

TABLE 3

Properties of comparative PP compositions

|  | CEx. 1 | CEx. 2 | CEx. 3 | CEx. 4 | CEx. 5 | CEx. 6 |
| --- | --- | --- | --- | --- | --- | --- |
| Description | HMS-PP | 2-MFR homopolymer | Fractional MFR homopolymer (contains <1 wt % ethylene) | Fractional MFR homopolymer (containing no ethylene) | HMS-PP | 2-MFR high crystalline hompolymer |
| MFR (dg/min.) | 2.5 | 2.0 | 0.6 | 0.6 | 0.3 | 2.0 |
| Melt strength (cN) | 45.0 | 10.0 | 63.2 | 72.6 | 53.0 | 10.0 |
| Melt extension (mm/s) | 172.2 | 100.0 | 97.3 | 89.8 | 119.0 | 100.0 |
| Tc (° C.) | 128.1 | 133.5 | 116.4 | 124.2 |  |  |
| Tm (° C.) | 158.3 | 162.9 | 158.1 | 162.3 |  |  |
| delta Hm (Joules/gram) | 97.2 | 112.3 | 90.4 | 100.9 |  |  |
| Flexural Modulus, sec (psi) | 239,632 |  |  |  |  |  |
| DTUL@ 66 psi (° C.) | 101 |  |  |  |  |  |

TABLE 3-continued

Properties of comparative PP compositions

| | CEx. 1 | CEx. 2 | CEx. 3 | CEx. 4 | CEx. 5 | CEx. 6 |
|---|---|---|---|---|---|---|
| Melt strength/MFR (cN/(dg/min)) | 18 | 5 | 105 | 121 | 177 | 5.0 |
| Melt strength/melt extension (mm/s) | 0.3 | 0.1 | 0.6 | 0.8 | 0.4 | 0.1 |

EXAMPLES 7-9

Low-Density and Medium Density Foamed Sheet with High Stiffness

The formulations and the properties of Examples 7-9 compared to Comparative Examples 7-9 are shown in Table 4. Examples 7-9 were made from the foamable composition of Example 1. Comparative Examples 7-9 were made from Comparative Example 1.

A foamed sheet was produced in a tandem foam extrusion line consisting of a first, 2.5-inch diameter, single-screw extruder feeding into a second, 3.5-inch diameter single screw extruder. The second extruder was fitted with an annular die with an external cooling ring. The barrel and the die temperatures of the second extruder were controlled using oil zone heaters plus a separate oil zone for the die, for cooling and temperature control. A cooling mandrel, knife, and winder were positioned downstream of the second extruder, such that upon leaving the die, the polymer sheet was cooled over the mandrel, then slit to form a sheet, and collected by a winder onto rolls.

The inventive modified-polypropylene of Example 1 was fed to a first extruder, along with additives to promote foaming, by a system of gravimetric feeders. The resulting admixture was heated and mixed by the extruder. Isobutane liquid was injected directly into the first extruder, downstream of screw elements designed to ensure good melting of the polymer and mixing with the additive prior to injection.

Foams with a range of density and thickness were produced by adjusting the concentration of gas injected into the extruder and by adjusting extruder temperatures to control the temperature of melt entering the annular die.

SAFOAM® FPE-50 is a pellet concentrate of an endothermic (heat absorbing) chemical nucleating and foaming agent for the creation of a foam structure in thermoplastics.

Examples 7-9 demonstrate that the combination of high stiffness, high melt strength, and high extensibility provided by the inventive foamable composition results in low-density foams and medium density foams with exceptional stiffness. Foams with density ranging from 0.045 to 0.137 g/cm$^3$ are demonstrated.

TABLE 4

Foam performance of inventive polymer compositions with butane blowing agent

| | CEx. 7 | Ex. 7 | CEx. 8 | Ex. 8 | CEx. 9 | Ex. 9 |
|---|---|---|---|---|---|---|
| Foam type | Low-density | Low-density | Medium-density | Medium-density | Medium-density | Medium-density |
| Isobutane (wt. %) | 6.4 | 4.8 | 2.7 | 2.2 | 2.9 | 2.3 |
| Talc TPM 1823 (wt. %) | 1.2 | 1.3 | 0 | 0 | 4.4 | 4.4 |
| SAFOAM ® FPE-50 (wt. %) | 0 | 0 | 0.2 | 0.1 | 0 | 0 |
| Melt Temperature (° C., IR gun) | 150 | 151 | 163 | 162 | 165 | 163 |
| Die Pressure (N/m$^2$) | 1930527 | 2206317 | 2068422 | 2413159 | 1930527 | 2206317 |
| Throughput rate (kg/hr) | 76.3 | 93.5 | 76.3 | 93.5 | 72.6 | 93.5 |
| Sheet Thickness (mm) | 3.2 | 3.3 | 1.5 | 1.1 | 1.1 | 1.1 |
| Sheet Thickness (inch) | 0.124 | 0.129 | 0.058 | 0.044 | 0.045 | 0.043 |
| Density (g/cm$^3$) | 0.052 | 0.048 | 0.117 | 0.158 | 0.137 | 0.159 |
| Yield strength, Mpa | 0.94 | 1.20 | 3.40 | 3.30 | 3.71 | 3.74 |
| Yield elongation, % | 11.6 | 8.5 | 6.3 | 9.6 | 6.2 | 6.9 |
| Tensile Tan Modulus (Mpa) | 23.44 | 34.47 | 123.4 | 132.4 | 139.3 | 150.3 |
| Tensile Stress at break (MPa) | 0.90 | 1.19 | 3.03 | 3.24 | 3.40 | 3.65 |
| Tensile elongation at break, % | 13.1 | 8.7 | 14 | 12 | 12 | 8.9 |

TABLE 4-continued

Foam performance of inventive polymer compositions with butane blowing agent

| | CEx. 7 | Ex. 7 | CEx. 8 | Ex. 8 | CEx. 9 | Ex. 9 |
|---|---|---|---|---|---|---|
| Flexural modulus (MPa) | 26.59 | 46.46 | | | | |

EXAMPLES 10-13

Low-Density Strand Foam from Modified PP

Examples 10-13, as shown in Tables 5 and 6, demonstrate that the combination of stiffness, high melt strength, and high extensibility provided by the inventive composition provides foams with a density as low as 0.10 g/cm$^3$.

Foamable composition Example 10 was produced by twin screw extrusion of polypropylene homopolymer powder having melt flow index 35 dg/min produced on a commercial production by Ziegler-Natta catalysis, 6500 ppm of a molecular melt comprised of DPOBSA phlegmatized in antioxidant, IRGANOX® 1010, 1500 ppm of antioxidant blend sold commercially as B225, and 500 ppm of calcium stearate as an acid scavenger. IRGANOX® B225 is an antioxidant, commercially available from BASF Corporation. IRGANOX® B225 is a blend of 50% tris(2,4-ditert-butylphenyl)phosphite and 50% pentaerythritol tetrakis[3-[3,5-di-tert-butyl-4-hydroxyphenyl]propionate]. It is basically a blend of 50% IRGAFOX® 168 and 50% IRGANOX® 1010.

Example 10 was used to produce low-density strand foam (Example 12) in a tandem twin/single extrusion system, consisting of a 34 mm diameter co-rotating twin screw feeding into a 40 mm diameter single screw extruder. The barrel and the die temperatures of the single screw extruder were controlled using three separate oil zone heaters plus a separate oil zone for the die to achieve cooling and temperature control. A two-hole rod die was attached at the end of the cooling extruder.

Example 10 was dry-blended with 0.75 wt % Mistron talc (3 micron) and fed into the hopper of the twin-screw extruder through a solid volumetric metering feeder. Liquid $CO_2$ blowing agent was injected in the twin-screw extruder through a positive displacement pump (dual piston HPLC pump) at 20 L/D of the extruder.

The second extruder temperatures were adjusted to adjust the melt temperature of the polymer strand exiting the dies, which was measured by a handheld thermocouple inserted into the melt. Foam density was measured by cutting small foam samples (50-60 mm long), weighing them on an analytical balance, and calculating volume using diameter and length measured with calipers.

Example 11 was produced by twin screw extrusion of: polypropylene homopolymer powder having melt flow index 35 dg/min produced on a commercial production by Ziegler-Natta catalysis, 6500 ppm of a molecular melt comprised of DPOBSA phlegmatized in antioxidant, IRGANOX® 1010, 1500 ppm of antioxidant blend sold commercially as B225, 500 ppm of calcium stearate, and 700 ppm GMS (Glycerol monostearate)

Example 11 was used to produce low-density strand foam (Example 13) in a tandem twin/single extrusion system, using the procedure described in Example 12.

TABLE 5

| Inventive polymer compositions (Examples 10-11) | | |
|---|---|---|
| Examples | Ex. 10 | Ex. 11 |
| PP (MFI 35) | 99.15 | 99.08 |
| DPOBSA phlegmatized in IRGANOX ® 1010 | 0.65 | 0.65 |
| IRGANOX ® B225 | 0.15 | 0.15 |
| Calcium stearate | 0.05 | 0.05 |
| Glycerol monostearate (GMS) | 0 | 0.07 |
| poly(sulfonyl azide), ppm | 0.156 | 0.156 |
| extruder type | 30 mm TSE | 30 mm TSE |
| feed location | main hopper | main hopper |
| melt temperature, ° C. | 234 | 234 |
| Residence time, sec | 30 | 30 |
| melt strength @190° C., cN | 0.45 | 0.45 |
| melt elongation @190 C., mm/s | 172 | 174 |

TABLE 6

| Foam performance of Examples 12-13 from inventive polymer compositions Examples 10-11 with $CO_2$ blowing agent | | |
|---|---|---|
| | Ex. 12 | Ex. 13 |
| Injection pressure (N/m2) | 2007059 | 1902948 |
| Gas pressure (N/m2) | 1813317 | 1737474 |
| Polymer feed rate (kg/hr) | 2.6 | 2.6 |
| $CO_2$ content (wt. %) | 1.5 | 1.5 |
| Mistron talc (wt. %) | 0.75 | 0.75 |
| Melt temperature (° C., probe) | 165 | 165 |
| Die pressure (N/M2, transducer) | 3516317 | 3323265 |
| Density (g/cm$^3$, caliper) | 0.11 | 0.1 |
| Expansion ratio | 8.3 | 8.7 |

EXAMPLES 14-17

Low-Density Strand Foams from Blends of Modified PP with Linear, High Melt Strength Polymer Examples 14-17 demonstrate that a novel blend comprising: an inventive modified polypropylene (azide-modified PP) blended with at least one additional, non-azide modified polypropylene provides a foam with low-density and closed cells. The second and optionally third, non-azide modified PP's may be a homopolymer, a random copolymer of propylene and ethylene, or a heterophasic blend of homopolymer and ethylene-propylene rubber, commonly known as an impact copolymer.

A series of foam extrusion demonstrations were conducted using a tandem extrusion line consisting of a first 34 mm diameter co-rotating Leistritz twin screw extruder (mixing extruder) feeding a second 40 mm diameter single screw extruder (cooling extruder.) Polymer pellets were dry-blended with 0.75 wt % Mistron talc (3 micron), blended by shaking in large plastic bags, and fed into the hopper of the twin-screw extruder through a solid volumetric metering feeder. The blowing agent (liquid $CO_2$) was injected in the twin-screw extruder through a positive displacement pump (dual piston HPLC pump) at 20 L/D of the extruder, with the goal of added $CO_2$ after complete melting of the material was achieved. The screws of the twin-screw extruder are specially configured to ensure good mixing of polymer and blowing agent. The barrel and the die temperatures of the single screw (cooling) extruder were controlled using three separate oil zone heaters plus a separate oil zone for the die to achieve proper cooling and temperature control. A two-hole rod die was attached at the end of the cooling extruder. On-line monitoring of die backpressure, pressure at the injection point within the primary TSE extruder, and the cross-over pressure (between the primary and secondary extruders) were provided. These trends provided indication that "steady-state conditions" had been reached after each process adjustment. The melt temperature was measured using a hand held temperature probe inserted into the foamed extrudate. The primary and secondary extruders were fully instrumented to record oil temperatures across multiple zones as well as screw speed and amperage draw. Samples were collected under steady-state conditions. Density was measured by cutting small samples (50-60 mm long), weighing them on an analytical balance, and calculating volume using diameter and length measured with calipers. Closed cell content was assessed qualitatively by dipping a sample of the strand into a solution of isopropanol and dye. Closed cells are indicated if the alcohol/dye solution does not penetrate the foamed sample.

TABLE 7

Low Density Foam Examples 14-17

| | Ex. 14 | Ex. 15 | Ex. 16 | Ex. 17 |
|---|---|---|---|---|
| HMS-PP type | S5 (inventive HMS-PP of Ex. 2) | S2 (inventive HMS-PP of Ex. 1) | S7 (inventive HMS-PP of Ex. 5) | S7 (inventive HMS-PP of Ex. 5) |
| 2nd polyolefin amount & type | 10 wt % F006EC3 (fractional MFR homopolymer with <1% C2) | 10 wt % TI4005F (fractional MFR heterophasic copolymer) | 15 wt % F006EC2 (see CEx 3) | 15 wt % F008NJ (see CEx 4) |
| 3rd polyolefin amount & type | N/A | 15 wt % DH020BF (2-MFR homopolymer) | N/A | N/A |
| #1 injection pressure, N/m2 | 2344211.6 | 1572000.7 | 1703000.8 | 1909843 |
| #2 gas pressure, N/m2 | 2130475 | 1441001 | 1551317 | 1696106 |
| Polymer feed rate, kg/hr | 2.7 | 2.7 | 2.7 | 2.7 |
| Calc wt % CO2 | 1.2 | 1 | 1.2 | 1.2 |
| Safoam FPN3, wt % | 0.5 | 0.5 | 0 | 0.5 |
| Talc, wt % | 2.6 | 1 | 0.75 | 1 |

EXAMPLES 18-19 AND RESULTING FOAMS ARE SHOWN IN TABLES 8-9

TABLE 8

| Examples | Ex. 18 | Ex. 19 |
|---|---|---|
| PP (MFI 37) | 94.3 | 94.4 |
| DPOBSA phlegmatized in IRGANOX ® 1010 | 0.65 | 0.55 |
| Calcium stearate | 0.05 | 0.05 |
| Poly(sulfonyl azide), % | 0.156 | 0.132 |
| Extruder type | 50 mm TSE | 50 mm TSE |
| Feed location | main hopper | main hopper |
| Melt temperature, ° C. | 489 | 490 |
| Residence time, sec | 38 | 41 |
| Melt strength @190° C., cN | 52 | 41 |
| Melt elongation @190° C., mm/s | 165 | 171 |

TABLE 9

| | Ex. 18 | Ex. 19 |
|---|---|---|
| Injection pressure (N/m^2) | 1634057 | 1496162 |
| Gas pressure (N/m^2) | 1365162 | 1544426 |
| Polymer feed rate (kg/hr) | 2.72 | 2.72 |
| $CO_2$ content (wt. %) | 1.2 | 1.2 |
| Mistron talc (wt. %) | 0.75 | 0.75 |
| Melt temperature (° C., probe) | 165.1 | 166 |
| Die pressure (N/m^2, transducer) | 2 268 375 | 310 |
| Density (g/cm³, caliper) | 0.13 | 0.14 |
| Expansion ratio | 6.9 | 6.4 |

EXAMPLES 20-24

Low Density Foam with Closed Cells

Examples 20-24 illustrated the foam having low density and closed cells. The following foam extrusion process was used to produce foamed sheet from the foamable composition of Example 6.

Polymer pellets were fed through a feed hopper to the barrel of a single screw extruder designed for foam processing. The extruder fed directly into a static mixer, which provided mixing and temperature control. A chemical blowing agent ECOCELL® 20P, available commercially from POLYFIL Corporation of Rockaway, N.J., was fed to the foam extruder along with talc, which acted as a cell nucleating agent. A physical blowing agent ($CO_2$ or butane) was injected directly into the barrel of the foam extruder. The mixture of molten polymer and liquid $CO_2$ exited the extruder through an annular die to produce a tube of foam, which was cooled over a mandrel and slit to provide a foamed sheet. Foamed sheet samples were collected under steady-state conditions.

The results of Examples 20-24 and Comparative Examples 10-11 are shown in Table 10. Density and closed cell content were measured on a Quantachrome pycnometer using methods. Cell count was obtained by calculation from the number of cells per unit area in an optical micrograph.

TABLE 10

Examples 20-24 and Comparative Examples 10-11

|  | Ex. 20 | Ex. 21 | Ex. 22 | Ex. 23 | Ex. 24 | CEx. 10 | CEx. 11 |
|---|---|---|---|---|---|---|---|
| Polymer Composition of | Ex. 6 | Ex. 6 | Ex. 6 | Ex. 6 | Ex. 6 | CEx. 1 | CEx. 1 |
| Physical blowing agent | butane | butane | butane | butane | $CO_2$ | butane | $CO_2$ |
| Gas feed wt. % | 1.6 | 4.8 | 1.6 | 1.6 | 1.2 | 4.7 | 1.2 |
| Chemical blowing agent wt. % | 0.075 | 0.075 | 0.3 | 0.6 | 0.075 | 0.075 | 0.075 |
| Talc (wt. %) | 0.2 | 0.2 | 0.2 | 0.2 | 0.2 | 0.2 | 0.3 |
| Die Melt Temperature (° C.) | 171 | 170 | 170 | 170 | 169 | 170 | 169 |
| Die Pressure (bar or $10^5$ pascals) | 27 | 33 | 30 | 29 | 32 | 36 | 31 |
| Pycnometer Density Mean (g/cc) | 0.203 | 0.113 | 0.238 | 0.236 | 0.173 | 0.082 | 0.202 |
| Closed Cell Content Mean (%) | 88.4 | 52.7 | 77.6 | 89.5 | 82.0 | 73.3 | 63.8 |
| Cell Count, cells/inch$^3$ | 268,807 | 284,783 | 18,366,033 | 24,496,440 | 806,027 | 702,751 | 115,353 |

Optionally a filler, an additive, or any other suitable ingredient, or combinations thereof can be mixed into the inventive compositions.

In another respect, the present disclosure provides a fabricated article and a method for making the fabricated article, which comprises the composition described above. Examples of a resulting article include but are not limited to thermoformable, foamed films and sheets, lightweight packaging trays, beakers and containers, microwaveable food packaging, technical foams for automotive applications such as headliners, carpet backing, door liners, parcel shelves, water shields, under-the-hood acoustic panels, cushioning and protective packaging, and thermal and acoustic insulation, and any other suitable article or combination thereof.

a xylenes solubles (XS) content of greater than 8 wt % as determined by acetone precipitation, and an intrinsic viscosity (IV.) of greater than 6.5 dL/g, wherein the ICP composition has a MFR of from 15 to 125 g/10 min.

Although the subject matter has been described in terms of exemplary embodiments, it is not limited thereto. Rather, the appended claims should be construed broadly, to include other variants and embodiments, which may be made by those skilled in the art.

What is claimed is:

1. A composition suitable for providing a foamed structure, comprising:
    a semi-crystalline polypropylene having a crystallinity of 50% to 80%; and
    a poly(sulfonyl azide) of at least 500 ppm, based on the total weight of the composition,
    wherein the composition has a melt strength of at least 20 cN, a melt drawability of at least 100 mm/s, and a flexural modulus greater than about 240,000 psi, and wherein the semi-crystalline polypropylene is a polypropylene homopolymer.

2. The composition of claim 1, wherein the composition has a heat distortion temperature under load of 66 psi (DTUL@ 66 psi) greater than 101° C.

3. The composition of claim 1, wherein the composition has a ratio of melt strength to melt flow rate (MFR) greater than 14.

4. The composition of claim 1, wherein the semi-crystalline polypropylene has a crystallinity in the range of from 60% to 80%.

5. The composition of claim 1, wherein the semi-crystalline polypropylene has a crystallinity in the range of from 70% to 80%.

6. The composition of claim 1, wherein the content of the poly(sulfonyl azide) is in the range from 500 ppm to 3000 ppm, based on the total weight of the composition.

7. The composition of claim 1, wherein the content of the poly(sulfonyl azide) is in the range from 1,000 ppm to 2,000 ppm, based on the total weight of the composition.

8. The composition of claim 1, wherein the composition has a ratio of melt strength/melt drawability of from 0.2 to 0.4.

9. The composition of claim 1, wherein the composition has a melting temperature in the range of from 160° C. to 170° C.

10. A foam comprising:
    a semi-crystalline polypropylene having a crystallinity of 50% to 80% and coupled with a poly(sulfonyl azide) of at least 500 ppm, based on the total weight of the foamable composition,
    wherein the semi-crystalline polypropylene coupled with a poly(sulfonyl azide) has a melt strength of at least 20 cN, a melt drawability of at least 100 mm/s, and the foam is a low density foam having a density in the range from 0.005 g/cm$^3$ to 0.6 g/cm$^3$, and wherein the semi-crystalline polypropylene is a polypropylene homopolymer.

11. The foam of claim 10, wherein the semi-crystalline polypropylene has a crystallinity in the range of from 70% to 80%.

12. The foam of claim 10, wherein the content of the poly(sulfonyl azide) is in the range from 2000 ppm to 7,000 ppm, based on the total weight of the foamable composition.

13. The foam of claim 10, wherein the semi-crystalline polypropylene coupled with the poly(sulfonyl azide) has a melt strength in the range of from 25 cN to 100 cN.

14. The foam of claim 10, wherein the semi-crystalline polypropylene coupled with the poly(sulfonyl azide) has a melting temperature in the range of from 160° C. to 170° C.

15. The foam of claim 10, wherein the density of the foam is in the range from 0.01 g/cm$^3$ to 0.1 g/cm$^3$.

16. A method of preparing a foam comprising:

mixing a foamable composition, comprising a semi-crystalline polypropylene having a crystallinity of 50% to 80% and a poly(sulfonyl azide) of at least 500 ppm, through a single extrusion step, having a melt strength of at least 20 cN, and a melt drawability of at least 100 mm/s, and wherein the semi-crystalline polypropylene is a polypropylene homopolymer.

17. The method of claim 16, further comprising:
solidifying the foamable composition; and
pelletizing the foamable composition.

18. The method of claim 16, further comprising:
forming a foam using the foamable composition and a blowing agent through a second single extrusion process, the foam being a low density foam having a density in the range from 0.005 g/cm$^3$ to 0.6 g/cm$^3$.

19. The method of claim 16, wherein the semi-crystalline polypropylene having a crystallinity of 50% to 80% is a polypropylene homopolymer having a melt flow index of at least 1.8.

20. The composition of claim 1, wherein the poly(sulfonyl azide) is 4,4'-diphenyl oxide bis(sulfonyl azide).

21. The composition of claim 1, further including an antioxidant.

22. The composition of claim 1, wherein the poly(sulfonyl azide) is in an amount of from about 1320 to 1560 ppm.

* * * * *